Nov. 3, 1942.  F. SEBESTYÉN ET AL  2,301,155
LOCK
Filed May 5, 1939  2 Sheets-Sheet 1
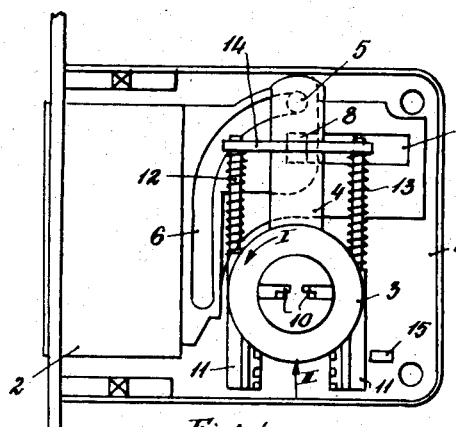
Fig.1.
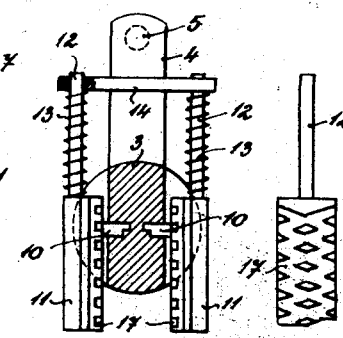
Fig.4.   Fig.5.
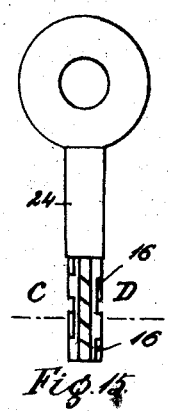
Fig.15.  Fig.16.
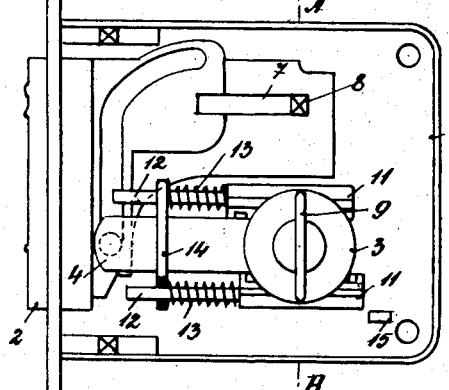
Fig.2.
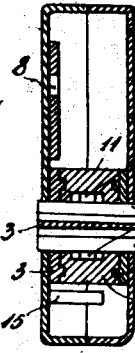
Fig.3.
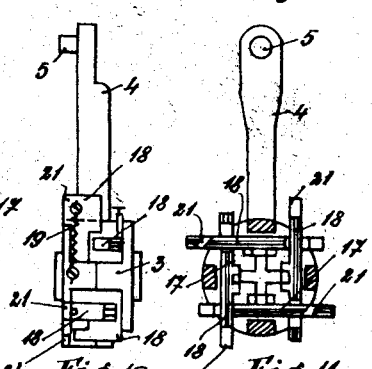
Fig.10.  Fig.11.
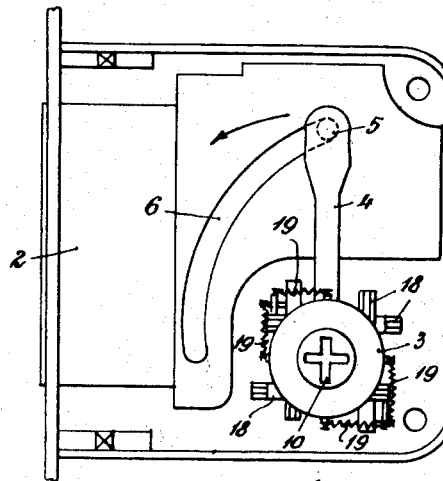
Fig.9.
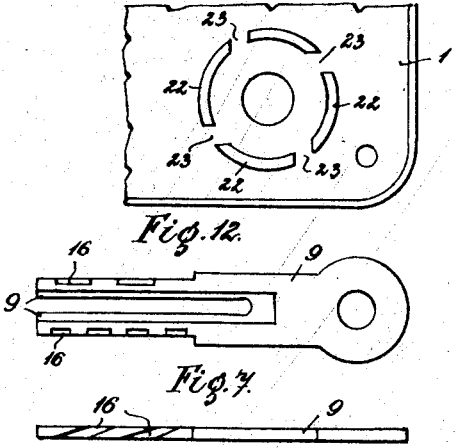
Fig.12.
Fig.7.
Fig.6.
INVENTOR:
Ferenc Sebestyén and István Karácsony
BY: Chatwin & Company
ATTYS.

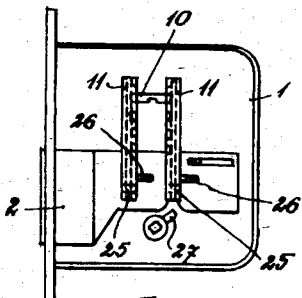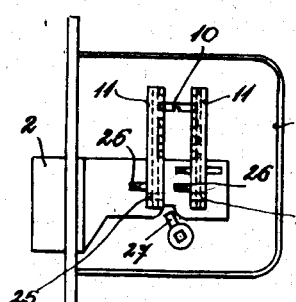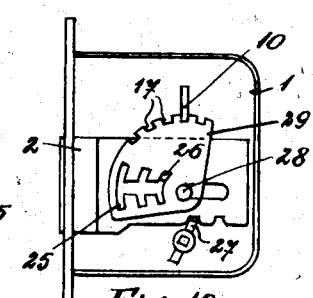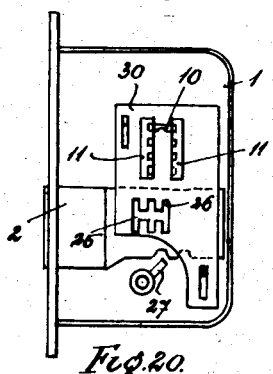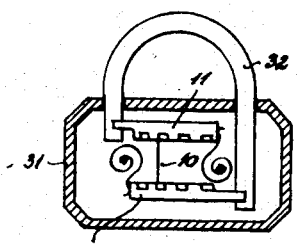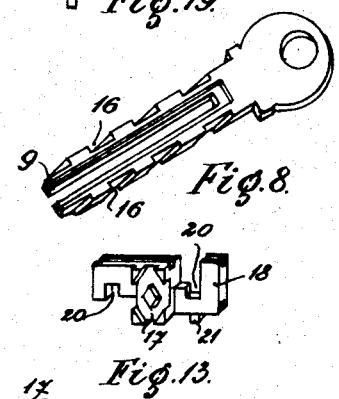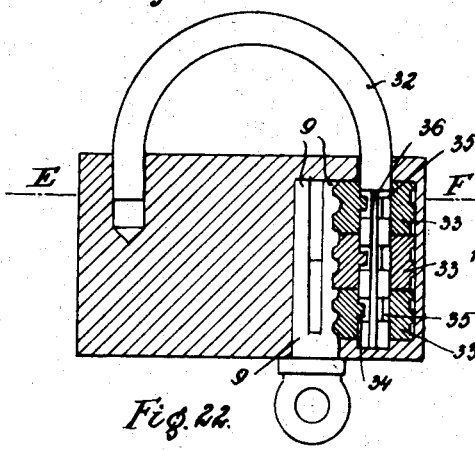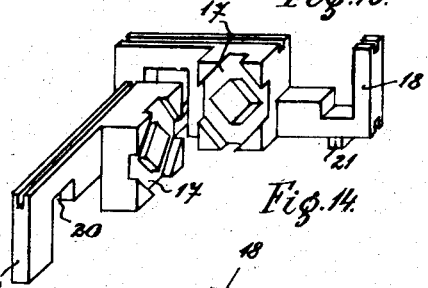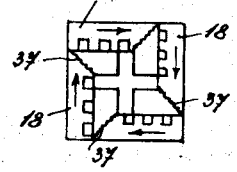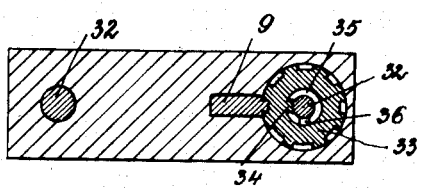

Patented Nov. 3, 1942

2,301,155

UNITED STATES PATENT OFFICE 2,301,155

LOCK

Ferenc Sebestyén and István Karácsony, Budapest, Hungary; vested in the Alien Property Custodian Application May 5, 1939, Serial No. 271,956
In Hungary May 24, 1938

4 Claims. (Cl. 70—134)

The invention relates to a lock and padlock, the substance of which is that on the side edges of the key shank rows of teeth comprising teeth of any desired distribution, cross-section and size are provided, the engaging surface of which is constituted by mutually parallel inclined planes of any desired direction and angle of inclination, whereas on the surface of the tumblers of the lock or padlock respectively, mutually parallel inclined grooves are provided, the arrangement of which, i. e. their size, cross-sectional shape, direction and angle of inclination suiting the tooth system of the key so that, when inserting the key in the lock, the teeth of the key will engage with the grooves and slide in them.

In constructing the lock in this manner the movement of the tumblers necessary to open the lock by a false key or nail cannot be accomplished even in the most favourable case. It is only with one tooth that the nail will be able to come into contact and thus the nail will not be able to accomplish the movement required for opening the lock.

In the annexed drawings several embodiments of the invention are shown by way of example.

Fig. 1 is a view of the interior of a door lock without handle provided with two sliding tumblers and one locking cylinder.

Fig. 2 is a view in locked position of a door lock of the same type as shown in Fig. 1, with the key inserted.

Fig. 3 is a sectional view taken on the line A—B of Fig. 2 after removal of the key.

Fig. 4 is a view of both sliding tumblers with the locking cylinder in section.

Fig. 5 is a view of the inner side of one sliding tumbler.

Fig. 6 is a view from the edge of the key.

Fig. 7 is a front view of the key.

Fig. 8 is a perspective view of the key.

Fig. 9 is a view of the inner side of a handleless door lock with locking cylinder, provided with four sliding tumblers which are actuated by a key having a cross-shaped cross-section.

Fig. 10 is a side view of the locking cylinder together with the sliding tumblers.

Fig. 11 is a front view of the four sliding tumblers with the locking cylinder.

Fig. 12 is a view of the bottom plate of the lock case after removal of the locking cylinder and of the sliding tumblers.

Fig. 13 is a perspective view of the sliding tumblers.

Fig. 14 is a perspective view of two sliding tumblers which fit into each other.

Fig. 15 is a side view of the key appertaining to the lock shown in Fig. 9.

Fig. 16 is a cross-sectional view of the key shank taken on line C—D of Fig. 15.

Fig. 17 is a schematic view of a lock with handle, in which two sliding tumblers are used.

Fig. 18 is a schematic view of the interior of the same lock in locked position.

Fig. 19 is a schematic view of the interior of another lock with handle in which the rim of the pivoted tumbler is provided with notches.

Fig. 20 is also a schematic view of the interior of a lock with handle, in which a toothed sliding plate is used which is movable in a direction perpendicular to the movement of the lock bolt.

Fig. 21 is a schematic view of the interior of a padlock provided with two sliding tumblers.

Fig. 22 is a sectional view of a padlock having ring shaped tumblers.

Fig. 23 is a sectional view taken on the line E—F of Fig. 22.

Fig. 24 is a view of a ring-shaped tumbler.

Fig. 25 is a view of a modification of the lock shown in Fig. 9.

In Figs. 1 to 3 of the drawings which show the constructional form of a handleless lock having a locking cylinder, 1 indicates the bottom-plate of the lock case, 2 the lock bolt and 3 the lock cylinder, which is carried between the bottom and top plates of the lock case (Fig. 3), whereas 4 indicates an arm fixed on the cylinder, a pin 5 projecting from said arm and extending in the guide slot 6 of the lock bolt. The movement of the lock bolt is guided by a lug 8 which projects from the bottom plate and engages with the slot 7 of the bolt.

In the lock cylinder 3 a guide opening 10 is provided for passage of the key 9 (Figs. 6 and 7), appertaining to the lock and on each side of this opening a guiding channel perpendicular to the axis of the cylinder is provided; in each of these channels a sliding tumbler 11 is inserted (Figs. 1 to 5). These sliding tumblers are under the action of helical springs 13 coiled around extensions 12 of the sliding tumblers. The one end of the springs 13 is fastened to the sliding tumbler 11, whereas the other end of the spring is supported by a plate 14 fixed to the arm 4 of the lock cylinder. This plate is provided with holes, through which the extensions 12 move. By the side of one sliding tumbler 11 a stop pin 15 projects from the bottom plate of the lock case, which stop pin prevents turning of the sliding tumbler 11 from the position shown in Fig. 1.

The lock is actuated by a key 9 (Figs. 6, 7). On each side edge of the key shank a row of teeth 16 is arranged of which the working surfaces consist of mutually parallel inclined planes. On the surfaces of the sliding tumblers a number of mutually parallel inclined tooth-grooves 17 is provided (Fig. 5) the distance between which, as well as their size and angle of inclination, is in accordance with the toothing of the key. In case the key can be inserted from both sides in the lock, the inclined tooth-grooves are formed in two mutually intersecting directions in order that when the key is inserted from either side of the lock the teeth 16 of the key should be able to penetrate into the tooth-grooves 17.

The lock operates in the following manner:

In the position shown in Fig. 1 the lock is open. If the lock bolt is to be shot into the closing position, the key appertaining to the lock is inserted in the key guide 10 and then the lock cylinder 3 is turned by aid of the key in the direction indicated by the arrow I. On inserting the key in the lock the front tooth 16 of each tooth-row of the key 9 penetrates into one inclined tooth-groove 17 of each sliding tumbler 11 and while said teeth are guided along the inclined grooves they force the sliding tumblers by pressure exerted upon their inclined surfaces to move in the direction indicated by the arrow II, Fig. 1, the said direction being perpendicular to that of the movement of the key. Owing to this movement a new tooth-groove 17 comes to be placed beneath the next tooth 16 of the row of teeth of the key and forces the sliding tumbler further in the direction of the arrow II. In this manner the teeth of the key force the sliding tumblers 11 always further and further in the direction of the arrow II increasing in the meantime the tension of the helical springs 13. After completely inserting the key in the lock, this insertion being limited by a stop, pin 15 does not hinder their rotation in the direction of the arrow I. Now the lock cylinder 3 and with it the sliding tumblers 11 are turned by means of the key in the direction of the arrow I, in consequence whereof the lock bolt will be shot into the closing position by the pin 5 projecting from the arm 4 and cooperating with the slot 6 of the lock bolt 2 (Fig. 2).

If now the key is removed from the lock, the springs 13 move the sliding tumblers 11 back to their former positions. In this position the sliding tumblers cannot be turned in a direction opposite to the arrow I (Fig. 1), that is to say the lock cylinder 3 cannot be turned back into its original position, since during the backward rotation the sliding tumblers 11 will make impact partly against the stop 15 and partly against the wall of the lock case. In this manner the lock bolt is blocked in its locking position and it can only be released from this position by inserting the key in the lock and moving the sliding tumblers again whereby the rotation of the lock cylinder 3 in the backward direction opposite to the arrow I becomes again possible.

The embodiment according to Fig. 9 differs from that of the Fig. 1 in that in the guiding channels of the lock cylinder 3 four sliding tumblers 18 are provided instead of two, said four tumblers surrounding the key guide 10 and the opposite tumblers being parallel to each other. Each of these sliding tumblers is subject to the action of a separate spring 19. The crossing points of the sliding tumblers 18 are provided with a cut 20 (Fig. 14) so that the sliding tumblers which cross each other can pass over each other and neither of them hinders the movement of the other. From one end of each of the four sliding tumblers a tooth 21 projects which is directed downwards (Figs. 10, 11 and 14) and in the bottom-plate of the lock case 1 slots 23 are provided in a stationary ring 22 (Fig. 12), which receive the teeth 21 of the sliding tumblers.

On the surfaces of the sliding tumbers with which the key engages, grooves 17 similar to those of the embodiment according to Fig. 5 are provided and corresponding tooth systems 16 are provided on the key 24 (Figs. 15 and 16). The key is here formed with a cross-shaped cross-section having on each rib a row of teeth in order to enable the said shafts to engage simultaneously with all the four sliding tumblers.

In the unlocked state of the lock the teeth 21 of the sliding tumblers 18 engage with the slots 23 of the ring 22 on the bottom-plate of the lock case 1 and thereby hinder the rotation of the lock cylinder 3. After inserting the key 24 into the lock the key will move all the four sliding tumblers 18 in their longitudinal direction in the manner described with reference to the embodiment according to Fig. 1, whereby the teeth 21 of the same leave the slots 23, and the rotation of the lock cylinder 3 and thus the shooting of the lock bolt 2 into the locking position by means of the arm 4 becomes possible. During the shooting of the bolt the lock cylinder revolves to the extent of 90 degrees. In this position the teeth 21 of the sliding tumblers 18 again come to be situated opposite the slots 23. When now the key is removed from the lock the sliding tumblers 18 return under the effect of the springs 19 into their former position, the teeth 21 entering the slots 23 whereby the lock bolt will be blocked. From this blocked condition the lock bolt can only be released by inserting the key into the lock.

The lock can also be constructed in such a manner that the four sliding tumblers can only be moved simultaneously. For this purpose a stepped surface 37 inclined to the longitudinal axis of the sliding tumbler is formed on one end of each sliding tumbler (Fig. 25); against this surface the end of the adjacent sliding tumbler makes impact if only one sliding tumbler is moved. If however the four sliding tumblers are all moved together the stepped surfaces 37 recede slowly from the end of the adjacent sliding tumblers so that a simultaneous movement of all four tumblers becomes possible.

In Fig. 17 a lock with handle is illustrated in a diagrammatical manner, in which two sliding tumblers 11 similar to those used in the embodiment according to Fig. 1 are employed. These sliding tumblers are provided with notches 25, whereas from the bolt 2 of the lock the lugs 26 project, which make impact against the sliding tumblers 11 and thus obstruct the movement of the lock bolt. If however the sliding tumblers 11 are moved by the key inserted into the key hole 10 of the lock into a position, in which their notches 25 come into alignment with the lugs 26 of the lock bolt 2, the latter can be moved along by the handle follower 27 engaging with the lock bolt 2, since the lugs 26 are able to pass through the notches 25.

After removal of the key the sliding tumblers 11, under effect of a spring not shown in the drawings, return into their former position and the lock bolt 2 is again blocked. (Fig. 18.)

In the embodiment according to Fig. 19 it is again a lock with handle that is illustrated in a diagrammatical manner, but here instead of the sliding tumbler a sector-shaped pivoted tumbler 29 is employed, which is rotatable around the pin 28. On the arc-shaped rim of this tumbler in front of the key hole, an inclined groove 17 is provided, which engages with the inclined toothing system of the key. In the tumbler, slots 25 are provided, whereas from the lock bolt 2 a lug 26 projects, which enables the lock bolt to be moved along by the handle follower 27 only when the tumbler 29 is set into such a position that the lug 26 lies on the centre line of the slots 25. A similar lock can also be constructed by using two or more tumblers arranged side by side or below each other, in which case the key inserted into the lock is rotating at the same time two or more tumblers around their individual axes of rotation. These tumblers can also be brought into coercive blocking connection with each other by the application of the same method as with the sliding tumblers shown in Fig. 25.

The lock with handle illustrated in Fig. 20 in a diagrammatical manner has the sliding tumblers 11 attached to a plate 30 and in this plate slots 25 are formed through which the lug 26 of the lock bolt 2 passes. On inserting the key into the lock, the toothed tumblers 11 and with them the plate 30, move along and come in a position in which the movement of the lug 26 in the slot 25, that is to say, the locking or unlocking of the lock, becomes possible.

In Fig. 21 a padlock is illustrated in a diagrammatical manner. In the padlock case 31 two sliding tumblers 11 are provided, which can be moved, by the key inserted into the key hole 10, in opposite directions. In the locked condition of the padlock one of these tumblers 11 engages with the slot of one shank of the shackle 32 of the padlock, whereas the other engages with the slot of the other shank of the same. On inserting the key in the hole 10 the tumblers 11 move in opposite directions whereby the blocking of the padlock shackle ceases.

This type of padlock can also be constructed in such a manner that the sliding tumblers 11 actuated by the key do not penetrate directly into the slots of the shanks of the padlock shackle, but are in contact with other sliding tumblers which block the padlock shackle.

In Fig. 22 is a sectional view of a padlock represented in which the shank of the padlock shackle 32, extending in the padlock case 31, is surrounded by tumblers in the form of rings 33, on the outer surface of which helicoidally shaped grooves corresponding to the tooth system of the key are provided. These rings are fitted on their inner side with teeth 34, which engage with the circumferential channels 35 formed on the padlock-shackle 32, thereby preventing the opening of the padlock. On inserting the key into the lock the ring-shaped tumblers 33 are turned into such a position, that their teeth 34 enter the longitudinal channel 36 of the swivel and thus enable the shackle to be extracted from the padlock.

Of course, in the lock as well as in the padlock, the manner of arranging the tumblers can be modified at will and, similarly, the size, direction and angle of inclination of the tooth systems of the key or tumblers respectively, can also be altered at will. The extremely large number of possible combinations renders the opening of the lock or padlock, respectively, entirely impossible without the correct key.

What we claim is:

1. In a lock, the combination of a casing and of a lock tongue-piece movable relatively to the casing, with tumblers on the surface facing the keyhole whereof mutually parallel oblique grooves are provided, said lock tongue-piece and tumblers being arranged and shaped in such a manner as to be adapted to be operated by a key, on at least one side edge of which key rows of teeth comprising surfaces of engagement situated in oblique planes are provided, on which rows of teeth the distribution, cross-sectional dimensions, direction and angle of inclination of the teeth suit the grooves of the tumblers, and which rows of teeth are, when the key is inserted into the lock, engaging in continuous succession in a manner similar to the mutual engagement of gearwheels with the oblique surfaces of the mutually adjacent parallel grooves of the tumblers.

2. In a lock, the combination of a casing and of a lock tongue-piece movable relatively to the casing, with tumblers on the surface facing the keyhole whereof mutually parallel oblique grooves are provided, said lock tongue-piece and tumblers being arranged and shaped in such a manner as to be adapted to be operated by a key, on at least one side edge of which key rows of teeth comprising surfaces of engagement situated in oblique planes are provided, on which rows of teeth the distribution, cross-sectional dimensions, direction and angle of inclination of the teeth suit the grooves of the tumblers, and which rows of teeth are, when the key is inserted into the lock from either side, engaging in continuous succession in a manner similar to the mutual engagement of gearwheels with the oblique surfaces of the mutually adjacent parallel grooves of the tumblers.

3. In a lock, the combination of a casing and of a lock tongue-piece movable relatively to the casing, with tumblers which are arranged around the keyhole and on the surface facing the keyhole whereof mutually parallel oblique grooves are provided, said lock tongue-piece and tumblers being arranged and shaped in such a manner as to be adapted to be operated by a key, on at least one side edge of which key rows of teeth comprising surfaces of engagement situated in oblique planes are provided, on which rows of teeth the distribution, cross-sectional dimensions, direction and angle of inclination of the teeth suit the grooves of the tumblers, and which rows of teeth are when the key is inserted into the lock, engaging in continuous succession in a manner similar to the mutual engagement of gearwheels with the oblique surfaces of the mutually adjacent parallel grooves of the tumblers.

4. In a lock, the combination of a casing and of a lock tongue-piece movable relatively to the casing, with a locking cylinder journalled in the lock casing, which locking cylinder stands in connection with the lock tongue-piece and with sliding tumblers arranged in the slots of the locking cylinder, and in the surface facing the keyhole whereof mutually parallel oblique grooves provided, said lock tongue-piece and tumblers being arranged and shaped in such a manner as to be adapted to be operated by a key, on at least one side edge of which key rows of teeth comprising surfaces of engagement situated in oblique planes are provided, in which rows of teeth the distribution, cross-sectional dimensions, direction and angle of inclination of the teeth suit the grooves of the sliding tumblers and which rows of teeth are, when the key is inserted into the lock, engaging in continuous succession in a manner similar to the mutual engagement of gearwheels with the oblique surfaces of the mutually adjacent parallel grooves of the sliding tumblers.

FERENC SEBESTYÉN.
ISTVÁN KARÁCSONY.